United States Patent [19]

Yoshida et al.

[11] Patent Number: 5,343,274
[45] Date of Patent: Aug. 30, 1994

[54] CONTACT PRINTING DEVICE FOR USE IN A PHOTOGRAPHIC PRINTER

[75] Inventors: Takashi Yoshida; Takashi Yamamoto, both of Kanagawa, Japan

[73] Assignee: Fuji Photo Film Co., Ltd., Kanagawa, Japan

[21] Appl. No.: 93,712

[22] Filed: Jul. 20, 1993

[30] Foreign Application Priority Data

Jul. 20, 1992 [JP] Japan .................................. 4-192283

[51] Int. Cl.⁵ .............................................. G03B 27/02
[52] U.S. Cl. ...................................... 355/79; 353/103; 355/19
[58] Field of Search ............ 355/19, 79, 85, 99; 353/103, 104, 114

[56] References Cited

U.S. PATENT DOCUMENTS

| | | | |
|---|---|---|---|
| 3,580,152 | 5/1971 | Engelsman et al. | 95/31 FM |
| 4,493,540 | 1/1985 | Burbank, III et al. | 353/122 |
| 4,876,619 | 10/1989 | Suzuki | 360/97.01 |
| 5,172,145 | 12/1992 | Stephenson | 353/103 |

*Primary Examiner*—Richard A. Wintercorn
*Attorney, Agent, or Firm*—Sughrue, Mion, Zinn, Macpeak & Seas

[57] ABSTRACT

A notch is formed in a lateral edge of a contact printing plate. An arresting lever is pivotally mounted in a plate guide path for guiding the contract printing plate into a printing position. The arresting lever is urged to protrude into the plate guide path, such that when the contact printing plate is inserted in a normal state into the plate guide member, the arresting lever is not engaged in the notch of the contact printing plate, but if the contact printing plate is inserted in the reversed state, the arresting lever engages in the notch and thus prevents the contact printing plate from moving further into the plate guide member. The contact printing plate has a pushing surface for pushing the arresting lever aside from the plate guide path.

10 Claims, 5 Drawing Sheets

CONTACT PRINTING DEVICE FOR USE IN A PHOTOGRAPHIC PRINTER

BACKGROUND OF THE INVENTION

1. Field of the Invention

The present invention relates to a contact printing device wherein a contact printing plate is placed on a film having an image recorded thereon and the image recorded on the film is printed onto a strip of photographic paper while the contact printing plate is in contact with the photographic paper. More specifically, the present invention relates to a contact printing device for use in a photographic printer for making a composite photographic print having a picture frame image and an auxiliary image in combination.

2. Description of the Related Art

Conventionally, a long strip of photographic paper, which is wound in a roll, is used in a photographic printer, in order to make photographic prints efficiently. It is also known to print an auxiliary image, such as letters and illustrations, in a composite print along with an image of a picture frame recorded on photographic film. A photographic printer for making such composite prints has an auxiliary printing unit in addition to an ordinary photographic printing system. In the auxiliary printing unit, a contact printing plate with a lithographic film having an auxiliary image, such as information, greeting words, ornamental patterns and the like, recorded thereon is placed in contact with the photographic paper in an exposure station of the auxiliary printing unit.

When the photographic paper is initially transported to the exposure station of the auxiliary printing unit, the leading end of the photographic paper may be curled as it enters into a rectangular exposure opening formed in a plate holder for holding the contact printing plate therein, and thus jam against a margin of the exposure opening. To solve this problem, it has been suggested to removably insert a blind or guide plate for closing the exposure opening during the initial paper feeding, for example, in Japanese Laid-Open Utility Model Application No. 63-43138. However, this requires manual insertion and removal of the blind plate every time a new strip of photographic paper is to be loaded and thus is cumbersome.

Furthermore, in a conventional contact printing device, the contact printing plate may be erroneously inserted in the reversed state into a printing position where the lithographic film is positioned in the exposure station. If the operator does not notice this error, many incorrect photographic prints containing the reversed image thereon could be made before the problem is noticed because ordinarily, a large number of composite prints are made from an original.

SUMMARY OF THE INVENTION

In view of the foregoing, an object of the present invention is to provide a contact printing device in which insertion of the contact printing plate in the reversed state is prevented, and thus an unfailing positioning of the contact printing plate is ensured.

Another object of the present invention is to prevent jamming of the photographic paper in an exposure opening of the plate holder without the need for insertion of a blind or guide plate or the like.

To achieve the first object, the present invention provides a plate guide member defining a plate guide path for guiding a contact printing plate therethrough into the printing position, and an arresting lever pivotally mounted in the plate guide member and biased into the plate guide path of the plate guide member. The arresting lever is disposed in the vicinity of a plate entrance of the plate guide member, preferably on one lateral side thereof in relation to the plate guide path. The contact printing plate further has at least a pushing surface for pushing the arresting lever to turn it aside from the plate guide path as the contact printing plate is inserted.

A notch is formed in the contact printing plate, preferably in one lateral side thereof, such that when the contact printing plate is inserted in a normal or proper state into the plate holder along the plate guide member, the notch is on the opposite side of the contact printing plate with repsect to the arresting lever, but if the contact printing plate is inserted in the reversed state, the arresting lever engages in the notch and thus prevents the contact printing plate from moving further into the plate holder.

Therefore, in the normal state, the contact printing plate can be inserted fully into the plate holder and the operator will be warned if the contact printing plate is inserted in a reversed position.

To achieve the second object, the present invention has an exposure opening formed in the plate guide member, and a transparent plate mounted in the exposure opening to cover the exposure opening.

Even when the contact printing plate is not yet placed in the printing position, the transparent plate covering the exposure opening serves as a guide plate for guiding a leading end of the photographic paper through the plate holder. Therefore, the paper leading end will not jam against a margin of the exposure opening.

BRIEF DESCRIPTION OF THE DRAWINGS

Other objects and advantages of the present invention will become apparent in the following detailed description of the preferred embodiments when read in connection with the accompanying drawings, wherein like reference numerals designate like or corresponding parts throughout the several views, and wherein.

DETAILED DESCRIPTION OF THE PREFERRED EMBODIMENT

Figure 1:
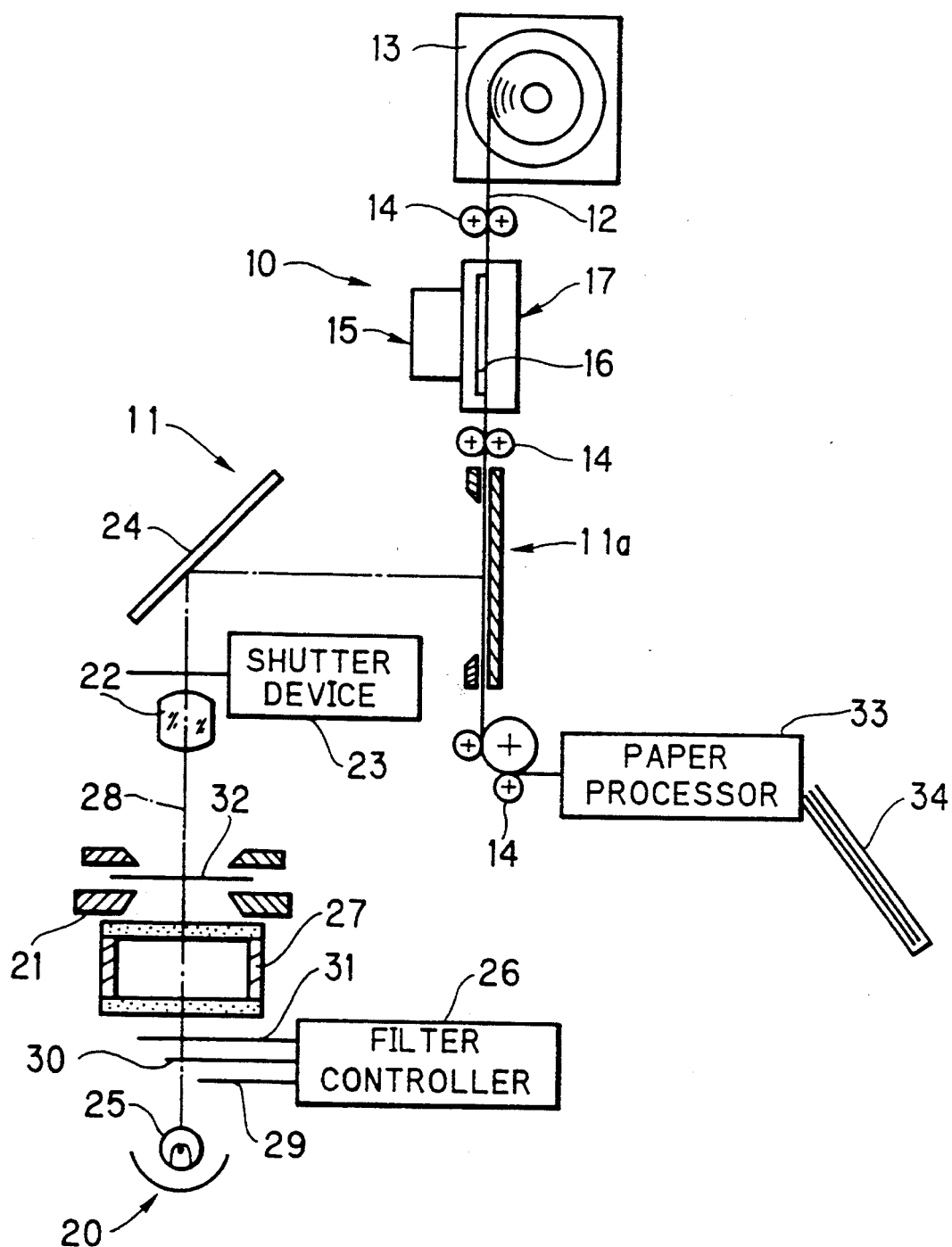
FIG. 1 schematically shows a photographic printer having a contact printing plate holder according to an embodiment of the invention.

In FIG. 1 showing a photographic printer for making composite prints according to the preferred embodiment, an auxiliary printing unit or letter printing unit 10 is disposed in an upstream portion of main photographic printing system 11 with respect to a paper feeding direction of photographic paper 12. The letter printing unit 10 is used for printing letters such as greeting words, address and name of a customer, and other information onto the photographic paper 12 in combination with an image of an original picture frame. The image of the original picture frame is printed by a the main printing system 11 in succession to the letter printing.

The photographic paper 12 is wound in a roll in a paper magazine 13, and fed by means of paper feed rollers 14 continuously and sequentially to an exposure station of the letter printing unit 10 and an exposure station 11a of the main printing system 11. The letter printing unit 10 is constituted of a lamp housing 15, a contact printing plate 16, and a plate holder 17. The letter printing unit will described in detail below.

The main printing system 11 is constituted of a light source section 20, a film carrier 21, a printing lens 22, a shutter device 23, and a mirror 24, in a known configuration. The light source section 20 includes a light source 25, a filter controller 26 and a mixing box 27. The filter controller 26 controls color balance and intensity of light 28 from the light source 25 by changing respective amounts of insertion of three color correction filters 29, 30 and 31 into the light path 28, and the mixing box 27 diffuses and mixes the printing light 28 passed through the filters 29–31.

The film carrier 21 holds photographic film such that a picture frame recorded on the photographic film 32 is properly positioned in the printing light path 28. The light 28 having passed through the picture frame is focused by the printing lens 22 and the mirror 24 onto the photographic paper 12 placed in the exposure station 11a, thereby to record a latent image of the picture frame onto the photographic paper 12 when the shutter device 23 is driven to make an exposure. The photographic paper 12, having been exposed, is then transported to a paper processor 33 for development and, thereafter, cut into individual pieces 34. Each piece constitutes, for example, a post card having a photograph and a letter printed thereon.

Figure 2:
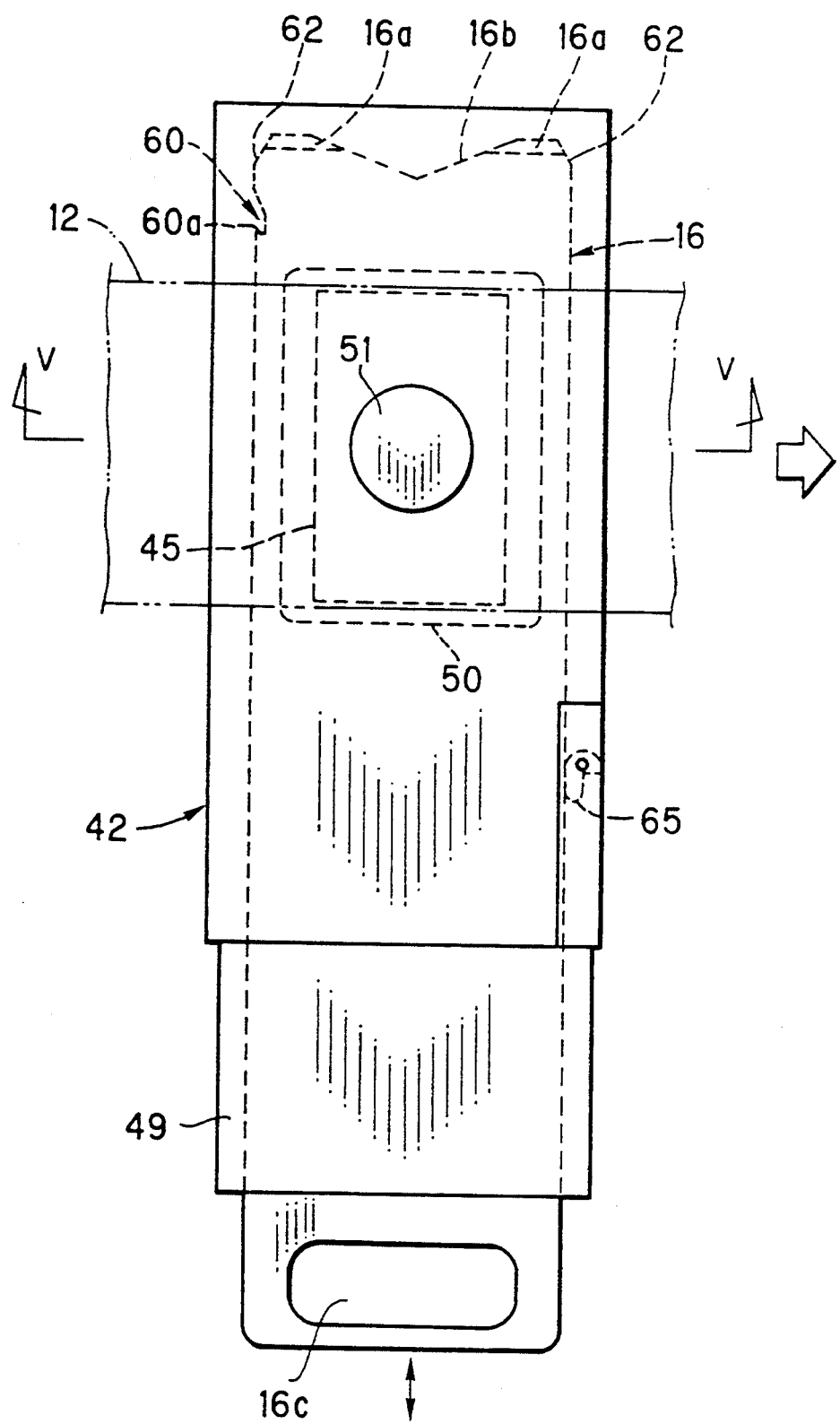
FIG. 2 is a plane view of the plate holder loaded with a contact printing plate of the preferred embodiment.
Figure 3:
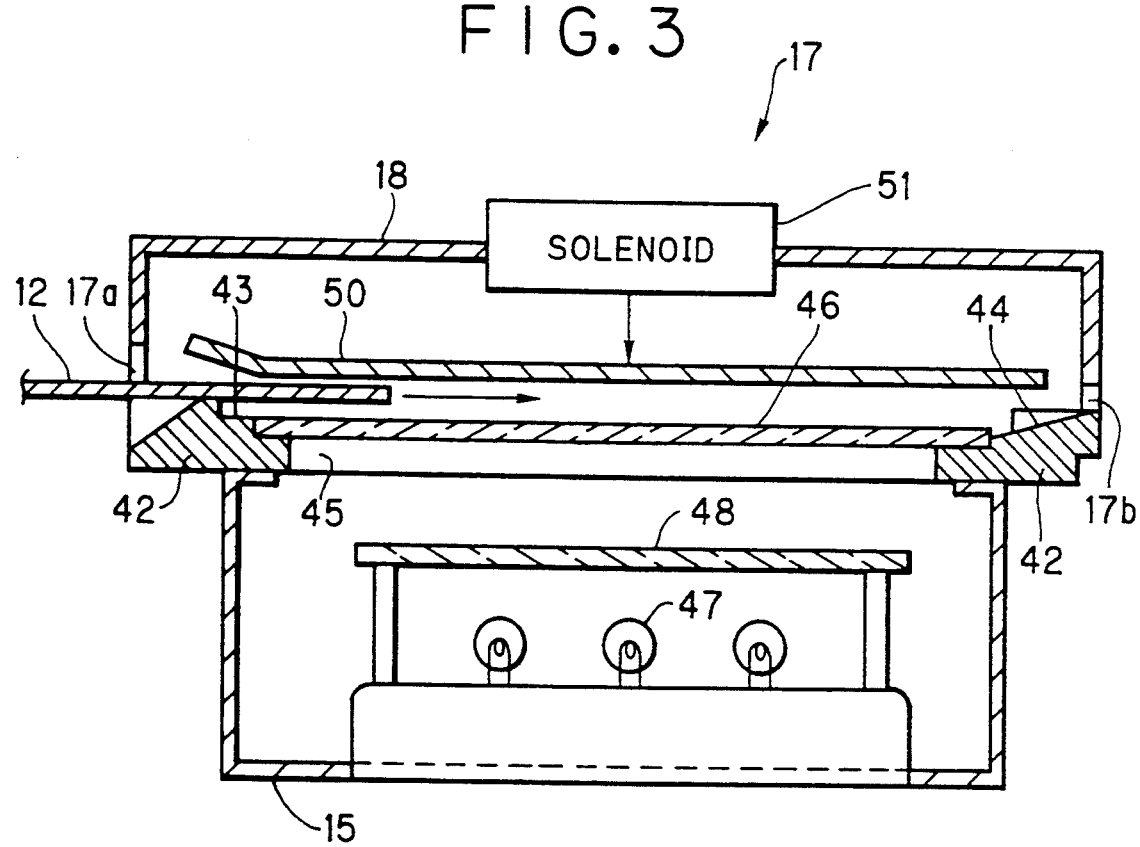
FIG. 3 is a sectional view of the plate holder taken on line V—V of FIG. 2, showing a position where the contact printing plate is not inserted.
Figure 4:
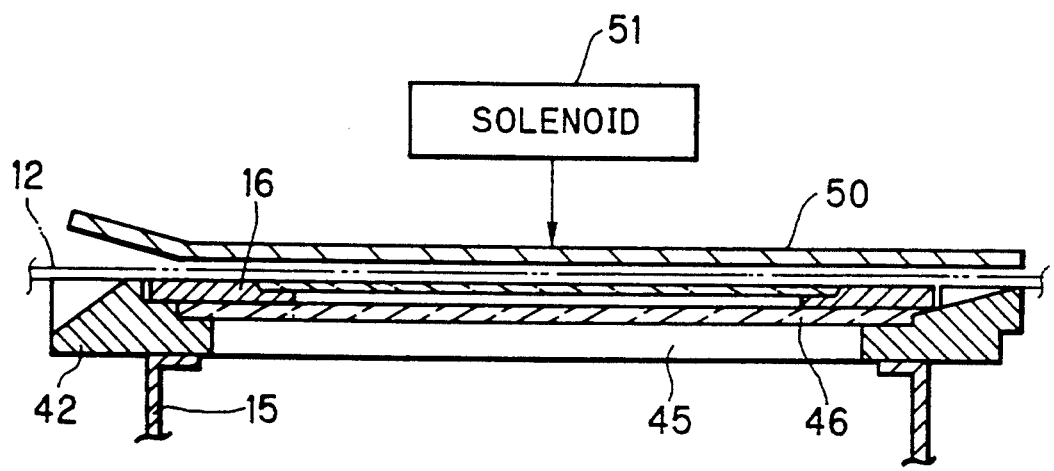
FIG. 4 is a view similar to FIG. 3, with certain parts omitted for clarity, but showing a position where the contact printing plate is inserted in the plate holder.

In the letter printing unit 10, as shown in FIGS. 2 and 3, the plate holder 17 for the contact printing plate 16 has a plate guide member 42 which removably guides the contact printing plate 16 in a direction transverse to the photographic paper 12. The contact printing plate 16 is slidably guided on stepped recess portions 43 formed along opposite lateral sides of the plate guide member 42, as shown in FIGS. 3 and 4. However, in the vicinity of paper outlet 17b of the plate holder 17, an inclined surface 44 is formed instead of the stepped recess portion 43. Thereby, a leading end of the photographic paper 12 inserted through a paper inlet 17a into the plate holder 17 cannot jam against the stepped recess portion 43, but is guided by the inclined surface 44 toward the paper outlet 17b. A housing 18 is disposed around the plate holder 17.

The plate guide member 42 also has an exposure opening 45 formed therein through which the photographic paper 12 is exposed to light form the lamp housing 15. Therefore, the exposure opening 45 defines the exposure station of the letter printing unit 10. A transparent plate 46 made of, for example, polycarbonate is fitted in the exposure opening 45 to cover the exposure opening 45. The lamp housing 15 accommodates a light source 47 and a diffusion plate 48 for equalizing the light from the light source 47.

As shown in FIG. 2, a light shielding portion 49 is provided at a plate entrance 42a of the plate guide member 42, to shield ambient light from entering the plate holder 17. The light shielding portion 49 is constituted of a pair of light-tight plates which are urged into contact with each other by the force of a resilient member. The contact printing plate 16 is inserted into the plate guide member 42 while thrusting through this light shielding portion 49 against the force of the resilient member.

Figure 5:
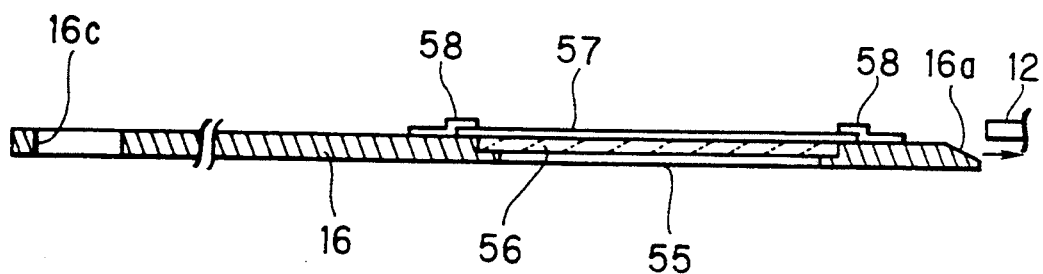
FIG. 5 is a longitudinal section of the contact printing plate.

As illustrated in FIGS. 2 and 5, the contact printing plate 16 has inclined surfaces formed on the top surface of a lading end thereof in the plate inserting direction and cutout 16b formed in a middle portion of the leading end, define a pair of tapered tips 16a on the lateral sides of the leading end. An opening 16c is formed in a trailing end portion of the contact printing plate 16 to allow the operator to easily grip the plate 16. The tapered tips 16a, facilitate thrusting of the contact printing plate 16 into the light shielding portion 49.

Also by virtue of the tapered tips 16a, even when the photographic paper 12 is loaded prior to the insertion of the contact printing plate 16, the leading end of the contact printing plate 16 is guided under the photographic paper 12 without striking against a lateral edge of the photographic paper 12. This is because the gap between the photographic paper 12 and the transparent plate 46 is maintained at a maximum in the vicinity of a paper inlet 17a and a paper outlet 17b of the plate holder 17, as the photographic paper 12 is nipped by the feed rollers 14 near the outside of the paper inlet and outlet 17a and 17b. Although the gap between the photographic paper and the transparent plate 46 fluctuates in the intermediate portions because of the elasticity of the paper 12, the tapered tips 16a can be reliably inserted into the gaps formed on the lateral sides of the plate guide member 42.

A paper pressure plate 50 is disposed over the plate guide member 42 in opposition to the exposure opening 45 thereof, to press the photographic paper 12 against the contact printing plate 16 during the exposure. The paper pressure plate 50 is actuated by a solenoid 51 to move toward and away from photographic paper 12 (see FIG. 4). The contact printing plate 16 has an exposure frame 55 formed in a leading portion thereof. The exposure frame 55 is positioned above the exposure opening 45 when the contact printing plate 16 is properly placed in the printing position. A transparent glass plate 56 is fitted in the exposure frame 55 (see FIG. 5). A lithographic film 57 having an auxiliary image, such as letters, recorded thereon is tightly overlaid on the glass plate 56 and secured thereto by means of black adhesive tape 58. The photographic paper 12 is brought into tight contact with the lithographic film 57 in the exposure station when clamped between the paper pressure plate 50 and the glass plate 56. Transparent adhesive tape may be substituted for the black adhesive tape 58.

Figure 6:
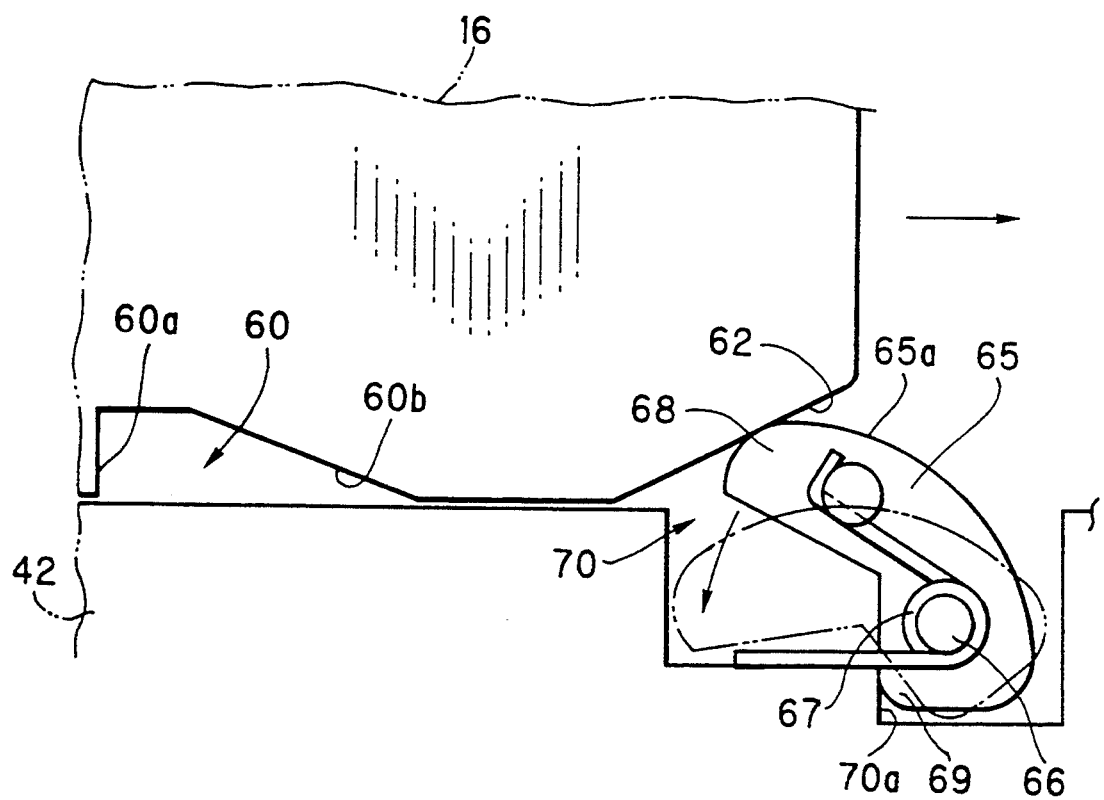
FIG. 6 is an enlarged plane view showing essential parts of the contact printing plate and an arresting lever of the plate holder of FIG. 2, with certain parts omitted for clarity.

As shown in FIGS. 2 and 6, the contact printing plate 16 further has notch 60 formed in a lateral edge near the leading end thereof, for preventing insertion of the contact printing plate 16 in the reversed state. A trailing margin of the notch 60 in the plate inserting direction defines an arresting surface 60a extending rectangular to the plate guiding or inserting direction. A leading margin 60b of the notch 60 is inclined relative to the plate guide path to make the notch 60 substantially V-shaped. The contact printing plate 16 also has diagonal pushing surfaces 62 formed in the corners of the leading end thereof. When the contact printing plate 16 is inserted into the plate guide member 42, one of the pushing surfaces 62 is brought into contact with an arched cam surface 65a of an arresting lever 65 disposed within the plate guide member 42 on one lateral side and in the vicinity of the plate entrance thereof.

The arresting lever 65 is pivotally mounted on an axle 66 and urged by a spring 67 to project a claw portion 68 of the lever 65 into the plate guide path. the arresting lever 65 has a stopper surface 69 defined thereon, which strikes against a stepped portion 70a of a recess 70 formed in the plate guide member 42 to limit the rotation of the arresting lever 65 in a clockwise direction in FIG. 6, and thus limit the amount of projection of the claw portion 68 into the plate guide path. As the contact printing plate 16 is inserted into the plate guide member 42, the arched cam surface 65a of the arresting lever 65 pushed by the pushing surface 62 to rotate the arresting lever 65 in a counter clockwise direction in FIG. 6 to the position indicated by the phantom line. Thereby, the arresting lever 65 is retracted from the plate guide path, as shown in FIG. 7.

Figure 7:
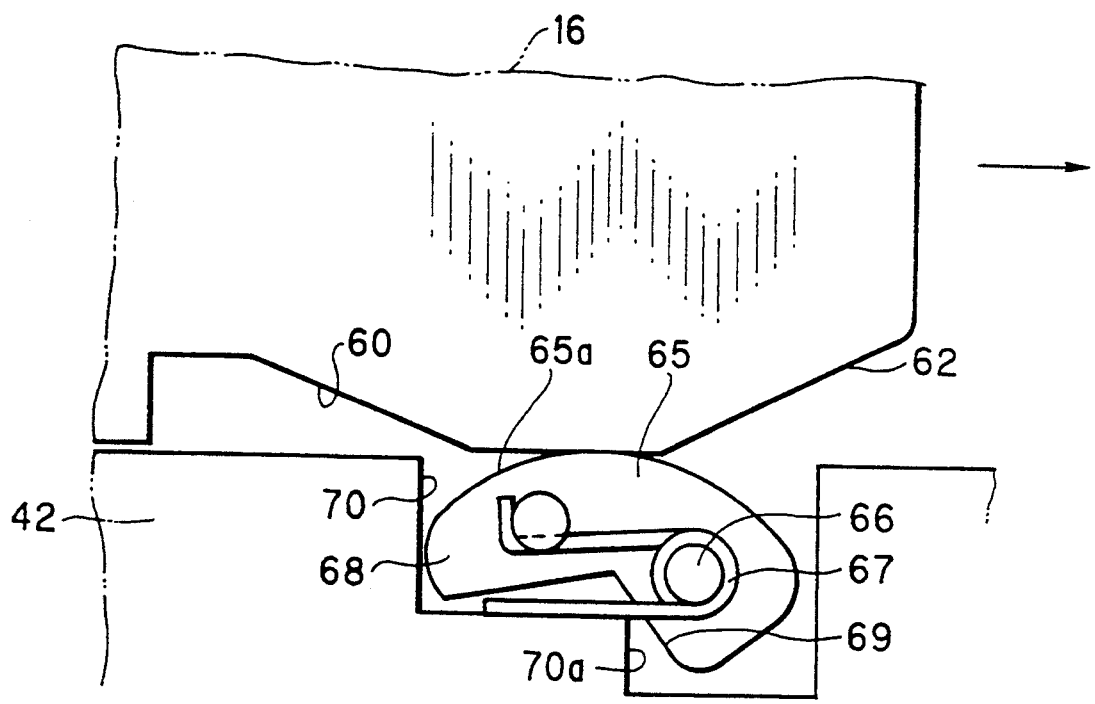
FIG. 7 is a view similar to FIG. 6, but showing another situation of the contact printing plate and the arresting lever.

Although the notch 60 of the contact printing plate 16 is located in the same lateral side as the arresting lever 65 in FIGS. 6 and 7, for illustrating the function of the arresting lever 65, the notch 60 should be located on the opposite side of the arresting lever 65 when the printing plate 16 is oriented properly as shown in FIG. 2. Therefore, in the proper state, the lateral edge having no notch formed therein depresses the arresting lever 65 into the retracted position, so that the contact printing plate 16 can be inserted further into the plate guide member 42.

If the contact printing plate 16 is inserted in the reversed state, the notch 60 will come to a position which is in opposition to the arresting lever 65. Then, the arresting lever 65 is rotated by the force of spring 67 in the clockwise direction, engaging the claw portion 68 with the arresting surface 60a of the notch 60. This engagement will not release as long as the contact printing plate 16 is pushed in the plate inserting direction, that is, forward in the plate guide path, thereby preventing the further insertion of the contact printing plate 16 into the plate guide member 42. When the contact printing plate 16 is pulled backward from the plate guide member 42, the cam surface 65a is pushed by the inclined surface 60b of the notch 60 to rotate the arresting lever in the counter clockwise direction and retract it form the plate guide path. Thereby, the contact printing plate 16 can be easily removed from the plate guide member 42.

Now, the operation of the above-described embodiment will be briefly described.

When loading a new strip of photographic paper 12, the photographic paper 12 from the paper magazine 13 is transported to be inserted into the paper inlet 17a of the plate holder 17 of the letter printing unit 10. If, at that time, the contact printing plate 16 has not yet been inserted into the printing position, as is shown in FIG. 3, the leading end of the photographic paper 12 is smoothly guided along the transparent plate 46 through the plate holder 17 without jamming against a margin of the exposure opening 45. If the contact printing plate 16 is already positioned in the printing position before the paper insertion, as shown in FIG. 4, the contact printing plate 16 itself serves as a guide plate for the photographic paper 12. Therefore, jamming of the photographic paper 12 cannot occur.

Figure 8:
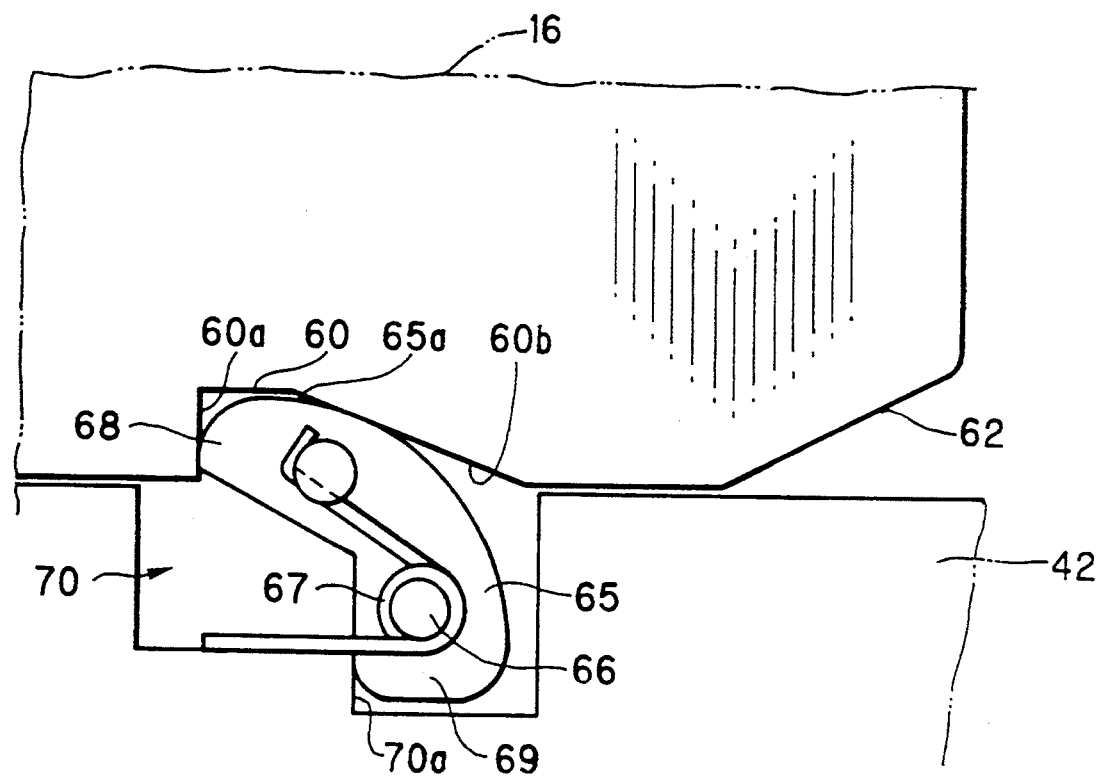
FIG. 8 is a view similar to FIG. 6, but showing a further situation of the contact printing plate and the arresting lever.

When the contact printing plate 16 is inserted along the plate guide member 42 into the plate holder 17, the arresting lever 65 would be engaged in the notch 60, as is shown in FIG. 8, if the contact printing plate 16 is in the reversed state. Therefore, further insertion of the contact printing plate 16 is prevented. If the contact printing plate 16 is properly inserted into the plate holder 17, the arresting lever 65 slides along a side surface of the contact printing plate 16 and is engaged in the notch 60, so that the contact printing plate 16 is allowed to be slid into the printing position. Simultaneously with the plate positioning in the plate holder 17, an original picture frame recorded on the photographic film 32 in association with this contact printing plate 16 is positioned in the film carrier 21. Then, an auxiliary image and an image of the original picture frame are printed as a composite image onto the photographic paper 12, in the respective exposure stations of the letter printing unit 10 and the main printing system 11. Thus, a predetermined number of post cards 34, or the like, each having the composite image printed thereon, are provided.

Although the arresting lever 65 is pivotable in the direction transverse to the contact printing plate 16 in the above-described embodiment, the arresting lever may be pivotable in the direction perpendicular to the contact printing plate. In this case, the notch and the pushing surfaces should be modified correspondingly, to prevent the insertion of the contact printing plate in the reversed state.

Also, the contact printing plate 16 may hold transparent film, or the like, having an image recorded thereon, instead of the lithographic film 57.

While the present invention has been described in detail above with reference to a preferred embodiment shown in the drawings, it will be apparent to those skilled in the art that various changes and modifications of the present invention are possible without departing from the scope of the invention as defined by the appended claims.

What is claimed is:

1. A contact printing device for making a composite photographic print by printing an auxiliary image recorded on photographic film, while keeping said auxiliary film in contact with photographic paper, said contact printing device comprising:

a contact printing plate holding said auxiliary film;

a plate guide member having a plate guide surface defined thereon for guiding said contact printing plate, through a plate guide path, into a printing position and holding said contact printing plate in tight contact with said photographic paper in said printing position;

an arresting lever pivotally mounted on said plate guide member and urged to protrude into said plate guide path, said arresting lever being disposed in the vicinity of an entrance of said plate guide path through which said contact printing plate is inserted;

at least a pushing surface defined on said contact printing plate to push said arresting lever to a position wherein said arresting lever is displaced from said plate guide path as said contact printing plate is inserted into said plate guide member; and a notch formed in said contact printing plate, such that when said contact printing plate is inserted in a proper state into said plate guide path, said notch is on the opposite side of said contact printing plate with respect to said arresting lever, but if said contact printing plate is inserted in a reversed state, said arresting lever engages in said notch and prevents said contact printing plate from moving further along said plate guide path.

2. A contact printing device as recited in claim 1, wherein said arresting lever is disposed along one lateral side of said plate guide path, and said notch is formed in one lateral edge of said contact printing plate which is located on the opposite side from said one lateral side of a said plate guide path when said contact printing plate is in said proper state.

3. A contact printing device as recited in claim 2, wherein said pushing surface is formed by diagonally cutting a corner of a leading end of said contact printing plate.

4. A contact printing device as recited in claim 3, wherein said arresting lever comprises an arched cam surface on which said arresting lever is pushed by said pushing surface of said contact printing plate, a claw portion which is engageable with said notch, and a stopper portion for limiting the amount of projection of said arresting lever into said plate guide path.

5. A contact printing device as recited in claim 1, further comprising:

an exposure opening formed in said plate guide member; and a transparent plate securely covering said exposure opening, a leading end of said photographic paper being guided along said transparent plate when said photographic paper is loaded prior to the insertion of said contact printing plate into said printing position.

6. A contact printing device as recited in claim 5, wherein said plate guide path extends in a direction transverse to said photographic paper, and said contact printing plate has an inclined surface formed on at least the top side surface of said contact printing plate to define a tapered leading edge, said top side surface being in contact with said photographic paper in said proper state of said contact printing plate.

7. A contact printing device as recited in claim 6, wherein said contact printing plate further has a cutout formed in a middle portion of said tapered leading edge.

8. A contact printing device as recited in claim 7, wherein said auxiliary film is a lithographic film.

9. A contact printing device as recited in claim 7, further comprising a lamp housing secured to said plate guide member and accommodating a light source for illuminating said auxiliary film through said exposure opening, and a pressure plate disposed above said exposure opening in opposition to said lamp housing, said pressure plate being movable between a first position which is remote from said auxiliary film and a second position which is close to said auxiliary film to selectively press said photographic paper into tight contact with said letter film.

10. A contact printing device as recited in claim 9, further comprising a light shielding member disposed at said entrance of said plate guide path for shielding ambient light form entering said plate guide member, said light shielding member being constructed by a pair of light-tight plates which are urged toward each other by a spring force.

* * * * *